(12) United States Patent
Sagebiel et al.

(10) Patent No.: US 10,696,577 B2
(45) Date of Patent: Jun. 30, 2020

(54) MOLD AND FINISH COOLING ARRANGEMENT FOR A GLASS MOLDING MACHINE

(71) Applicant: Heye International GmbH, Obernkirchen (DE)

(72) Inventors: Helmut Sagebiel, Hameln (DE); Daniel Hardekopf, Lauenhagen (DE); Benedikt Felgenhauer, Herford (DE); Ralf Schöttelndreier, Nienstädt (DE)

(73) Assignee: Heye International GmbH, Obernkirchen (DE)

( * ) Notice: Subject to any disclaimer, the term of this patent is extended or adjusted under 35 U.S.C. 154(b) by 0 days.

(21) Appl. No.: 15/752,311

(22) PCT Filed: Aug. 7, 2017

(86) PCT No.: PCT/EP2017/000957
§ 371 (c)(1),
(2) Date: Feb. 13, 2018

(87) PCT Pub. No.: WO2018/046114
PCT Pub. Date: Mar. 15, 2018

(65) Prior Publication Data
US 2020/0095153 A1    Mar. 26, 2020

(30) Foreign Application Priority Data

Sep. 9, 2016  (DE) .......................... 10 2016 010 802

(51) Int. Cl.
*C03B 9/38*       (2006.01)
(52) U.S. Cl.
CPC .......... *C03B 9/3883* (2013.01); *C03B 9/3833* (2013.01); *C03B 9/3866* (2013.01); *C03B 9/3891* (2013.01)

(58) Field of Classification Search
None
See application file for complete search history.

(56) References Cited

U.S. PATENT DOCUMENTS 5,304,229 A * 4/1994 Swanfeld .............. C03B 9/3891
                                                         65/265
5,330,551 A    7/1994 Bolin
(Continued)

FOREIGN PATENT DOCUMENTS

EP    1149806 B1    10/2001
WO    9412440 A1    9/1994

OTHER PUBLICATIONS

EP1149806A Google Machine Translation Performed Jan. 29, 2019 (Year: 2019).*

*Primary Examiner* — Lisa L Herring
(74) *Attorney, Agent, or Firm* — Fox Rothschild LLP

(57) ABSTRACT

A mold and neck ring cooling system for a glass molding machine is characterized by a cooling air guide, in which separate and in particular independently switchable air guides for a neck ring cooling section- and a mold cooling section are provided. Here, a cooling piece serving the cooling air feed in the mold is connected to a station box via a cooling channel which is articulated on both sides and slidably connected on one side for length compensation, wherein the height position of the cooling piece is constant relative to the station box. A cooling structure intended for the neck ring cooling section is adjustable in its height in relation to the station box by means of a drive. All valves and bearing points are arranged protected against an environmental influence of a glassworks containing abrasive substances.

21 Claims, 10 Drawing Sheets

(56) References Cited

U.S. PATENT DOCUMENTS

2006/0179884 A1* 8/2006 DiFrank ............... C03B 9/3532
                                                          65/85
2017/0121208 A1* 5/2017 Engelking ............ C03B 9/3537

* cited by examiner

MOLD AND FINISH COOLING ARRANGEMENT FOR A GLASS MOLDING MACHINE

BACKGROUND

The invention relates to a mold and neck ring cooling system for a glass molding machine, such as an I.S. machine.

For shaping and obtaining the desired mechanical properties of a parison and the molded hollow glass article formed therefrom, it is important to have desired uniform and in particular reproducible temperature conditions during the molding process in the blank molds and blow molds of a glass molding machine. This concerns the actual mold cooling provided by coolant holes in the mold walls, and the neck ring cooling, which relates to the finish area of the article to be molded, namely a hollow glass article. Added to this is the configuration of the elements necessary to guide the coolant, e.g., cooling air, which is simple and economical to maintain and repair and which should be equally configured for use in the abrasive operating environment of a glassworks.

Since the molds are usually composed of mold halves that are movably arranged between an open and a closed position during the molding process, the coolant guidance concept must provide a movable section which forms the link between, on the one hand, a fixed coolant supply arranged, for example, in a station box and on the other hand, movable parts corresponding to the opening and closing movement. Also of further importance is the question of the complexity of a conversion to a different mold height in terms of workmanship.

It has been found that the requirements listed above cannot be fully met with the prior known embodiments of a cooling arrangement.

In known embodiments, the mold and a neck ring cooling are supplied with cooling air from a common opening of the station box. A use of separately switchable, sufficiently dimensioned valves is thus often not possible, in particular for the mold cooling.

A generic mold and neck ring cooling arrangement is known from EP 1 149 806 A2, in which a neck ring cooling and a mold cooling are provided independent of each other. In this case, however, a telescoping cooling tube is provided as part of the mold cooling, but the elements provided to adjust for changes in length are unprotected against the operational conditions of the glass molding environment.

SUMMARY

It is therefore an object of the invention to improve a mold and neck ring cooling system of the type described above with regard to the cooling air guide, susceptibility to wear, complexity of conversion and ease of maintenance. This object is achieved with a mold and neck ring cooling system in accordance with aspects of the disclosure.

Essential to the invention is hereinafter a mold cooling section independent of the neck ring cooling section, in which a cooling channel is integrated into the mold cooling section, which forms the link between fixedly arranged parts such as a station box and moving parts such as a mold holder. The cooling channel is articulated at one end, for example, pivotable about an axis with the station box and articulated at its other end, for example, pivotally and enabling a length compensation in combination with a support assembly, which is arranged on the mold holder. This allows the possibility of arranging the structural functional elements required for producing the pivotability and the length compensation of the cooling channel in a protected manner against contamination and other operational environmental influences, namely included on or in the station housing and in the aforementioned assembly. This further allows the possibility of using a cooling channel having a large cross-section, which executes only slight compensating movements in the context of the opening and closing movements of the mold holder, so that there is correspondingly only slight wear. This achieves a highly flexible operation of the glass molding process oriented towards the production of an article-specific and appropriate cooling capacity.

The neck ring cooling section is separated from the mold cooling section since these are associated with openings of the station housing separate from one another. In this way, it becomes possible to use separately switchable valves as part of the mold cooling section and the neck ring cooling section and in particular for the mold cooling section, but also the use of sufficiently dimensioned valves for the neck ring cooling section. In contrast, the common supply of neck ring and mold cooling from an opening per side in the station box is known from the prior art.

The cooling piece forms the link between said assembly and a mold half. The cooling piece is provided with vertically oriented air outlets on its end facing toward the mold half, the air outlets being arranged in a certain section for engaging under a step of the mold half and in this way can be brought in a continuous connection with the cooling air holes of the mold half. The cooling piece is releasably connected to the assembly for ease of replacement.

A longitudinal displaceability is produced by slidably receiving the cooling channel within the receiving section, so that outside of the receiving section, no arrangements arise, such as a telescopic design of the cooling channel, which are exposed to the operational environmental influences of the glass molding process. It is essential that wear considerations have been taken into account in this type of embodiment, so that sliding surfaces and other bearing points are arranged protected. As far as lubrication points are provided, they should be set up according to the planned service life.

The connecting section provided according to another aspect of the disclosure is connected to the assembly and is internally equipped to produce a pivotable and longitudinally displaceable receptacle of the cooling channel. The connecting section thus serves to produce a protected receptacle of the end of the cooling channel facing toward the same.

According to the features of the disclosure, the assembly carrying the connecting section is detachably connected to a mold holder and includes a throttle housing. It is therefore easily replaceable if necessary. A blocking body is movably received in the throttle housing, by which the shape and position of the cooling air within the flow path can be changed as part of the mold cooling section of the cooling air flow. The cooling air flows of a right and a left half of a mold half can be set independently of each other.

The cooling channel has a rectangular cross-section according to other features of the disclosure.

According to other aspects of the disclosure, the intended step for the support of the mold half is located in the lower region. The cooling air flows through the walls within the cooling air holes, thus from bottom to top. In this way, an excessive cooling of the neck region of the molded hollow glass article is prevented from arising in a blank mold, wherein at the same time, a sufficient cooling of the bottom region can be produced. In addition, this way avoids heating up the surface of the station box and turbulence or impairment of the neck ring cooling air. However, a reverse flow direction of the cooling air and a corresponding arrangement of the cooling piece relative to the mold half is not excluded.

Other features of the present disclosure are directed to a further constructive implementation of the arrangement of the cooling piece. The said assembly is provided with a step on which the cooling piece is supported. The fact that the cooling piece is located at a fixed height in relation to the mold holder eliminates a height adjustment in a transition to another mold height, so that conversion work is simplified in this respect. The mold cooling section is set up as 360° cooling.

Other aspects of the disclosure are directed to an embodiment of the neck ring cooling section. This comprises a height-adjustable cooling structure, which is arranged partially within the station housing and is provided with a section having outlet slots at its end protruding from the station box. This section is preferably detachably connected to the cooling structure for the purpose of adaptation to different mold halves, and the outlet slots have a horizontal outflow direction directed towards the finish area of the molded hollow glass article. The cooling structure is displaceable within a guide housing, in particular arranged height-adjustable, which in turn is firmly connected to the station box. The height adjustability is associated with a drive which is connected to a screw jack via a drive shaft. Under the guide housing, thus within the station box, hangs the screw jack, which is thus optimally arranged protected against environmental influences from the glass production process.

The drive intended for height adjustment of the neck ring cooling section, in particular the cooling structure, is mounted on the outside of the station box according to the features of the present disclosure and is thus easily accessible for repair and inspection purposes. For example, a servomotor or a stepper motor can be used as part of the drive, so that a very accurate height adjustment is possible. The drive including its drive shaft can be pulled out of the screw jack when replacing the neck ring cooling section.

According to the features of the disclosure, an automatic height adjustment of the neck ring cooling section can be produced in conjunction with an article database, in which different height dimensions of the molds used are stored.

The flow paths set up for the neck ring cooling section are equipped according to other aspects of the disclosure with devices for throttling the cooling air flow, so that in this respect an adjustment of the cooling capacity is provided to the required needs. The cooling structure preferably made of cast iron is designed to optimize flow and can be provided with devices for throttling for each half of a neck ring molding tool.

The cooling air guide according to the invention is mainly intended for cooling the blank mold in conjunction with a parallel locking mechanism.

BRIEF DESCRIPTION OF THE DRAWINGS

The invention will be explained in more detail below with reference to the embodiment shown in the drawings, wherein.

DETAILED DESCRIPTION

Figure 1:
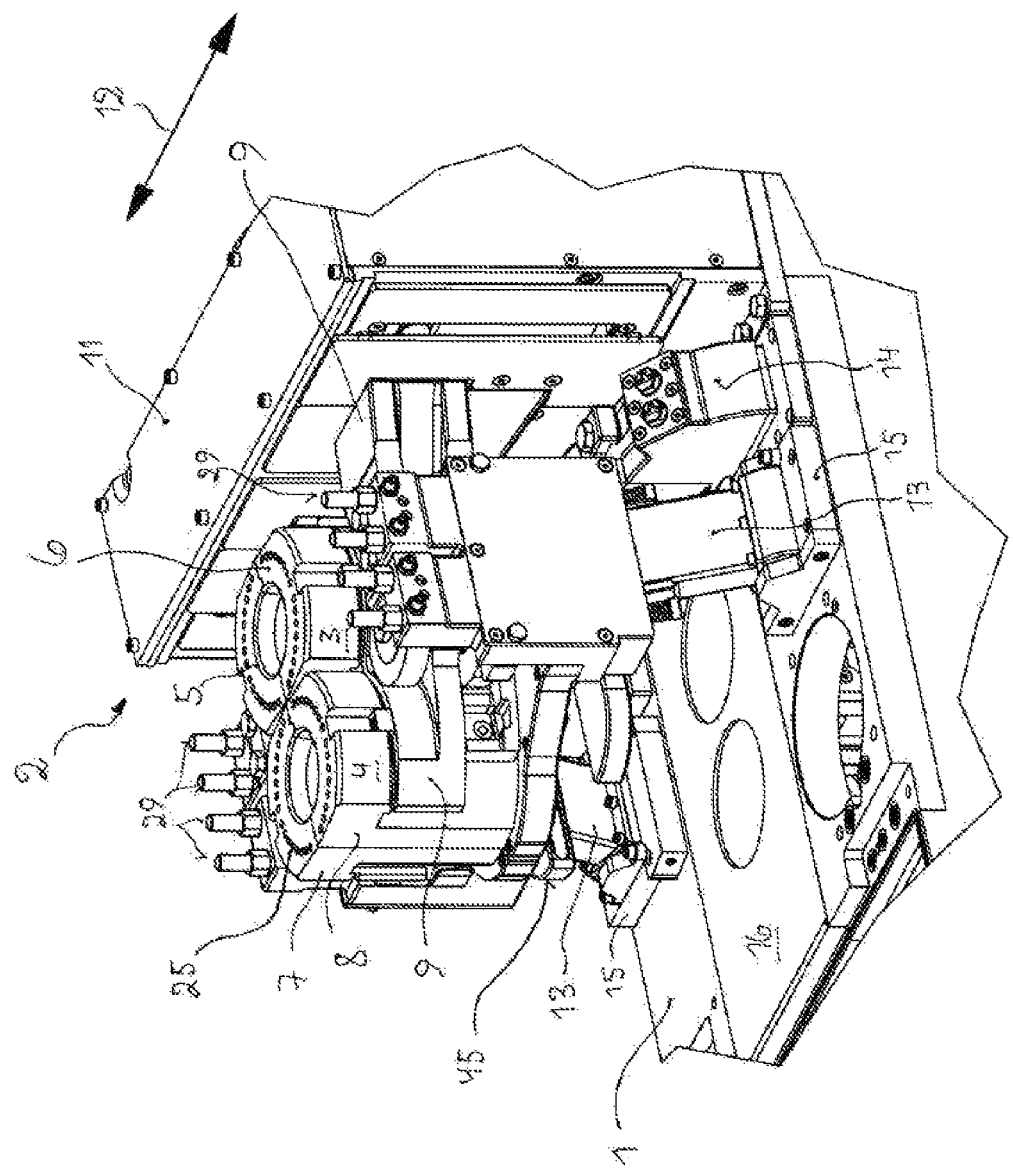
FIG. 1 is a perspective side view of a mold closing mechanism with mold and neck ring cooling section of a glass molding machine.
Figure 2:
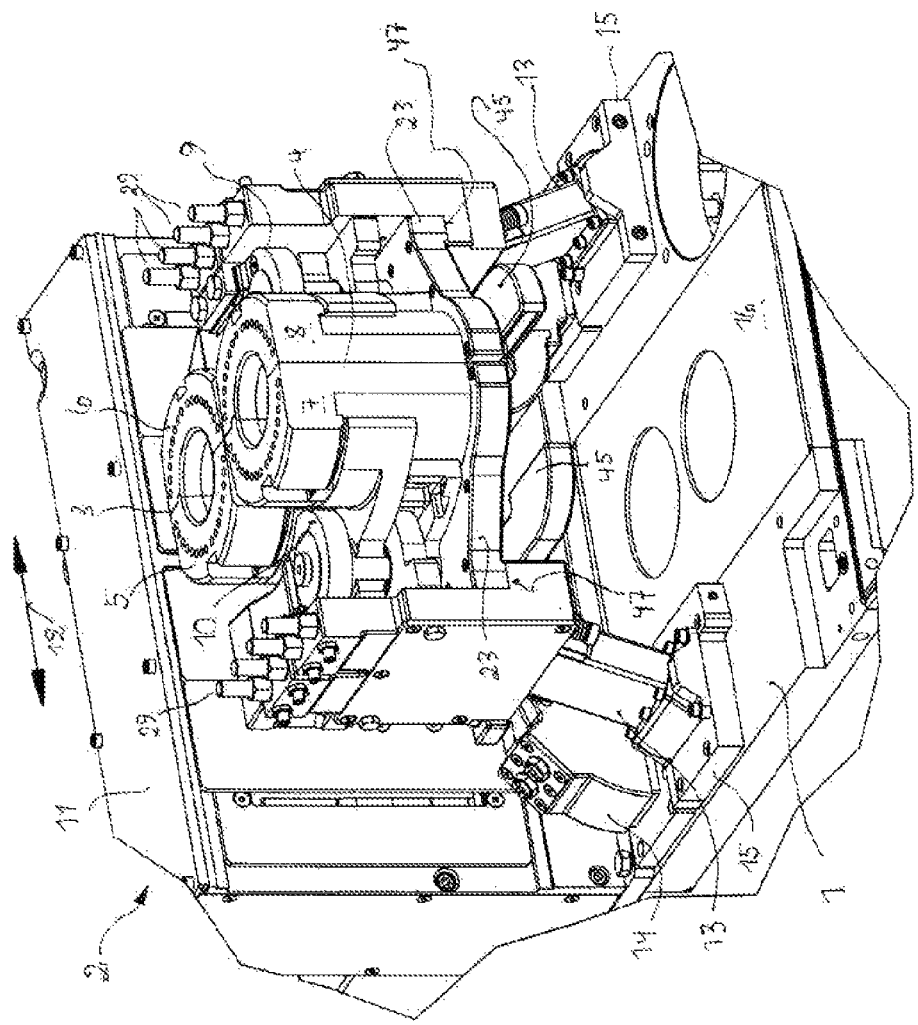
FIG. 2 is a perspective front view of the mold closing mechanism with mold and neck ring cooling section according to FIG. 1.
Figure 3:
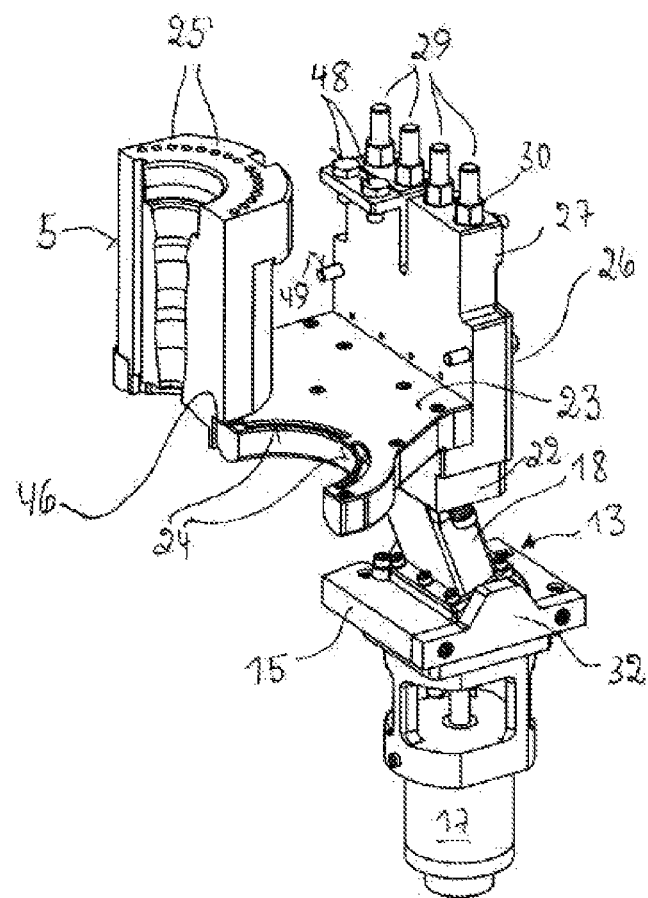
FIG. 3 is an isolated perspective side view of the cooling air guide for the molds.
Figure 4:
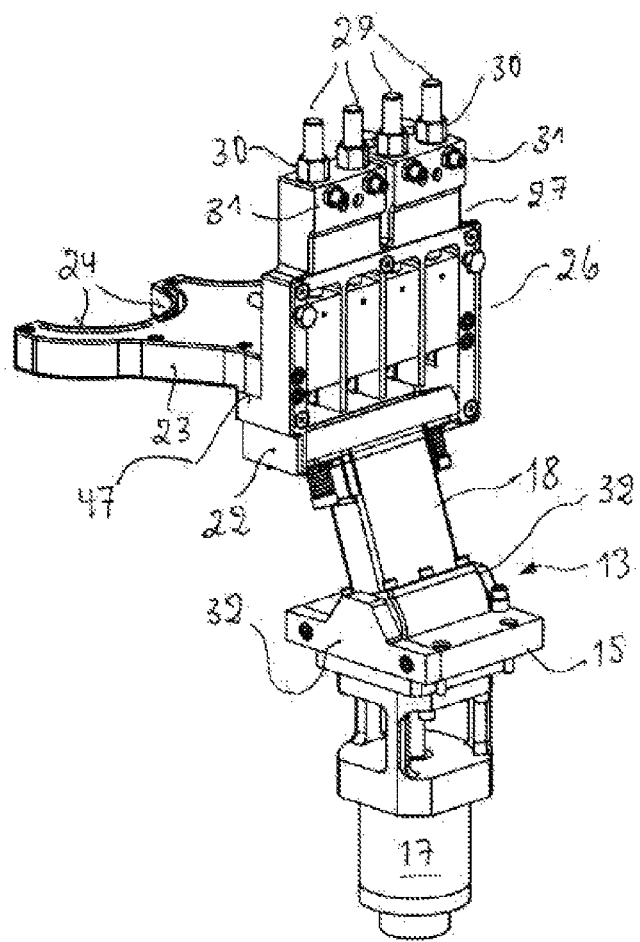
FIG. 4 is an isolated perspective side view of the cooling air guide for the molds.
Figure 5:
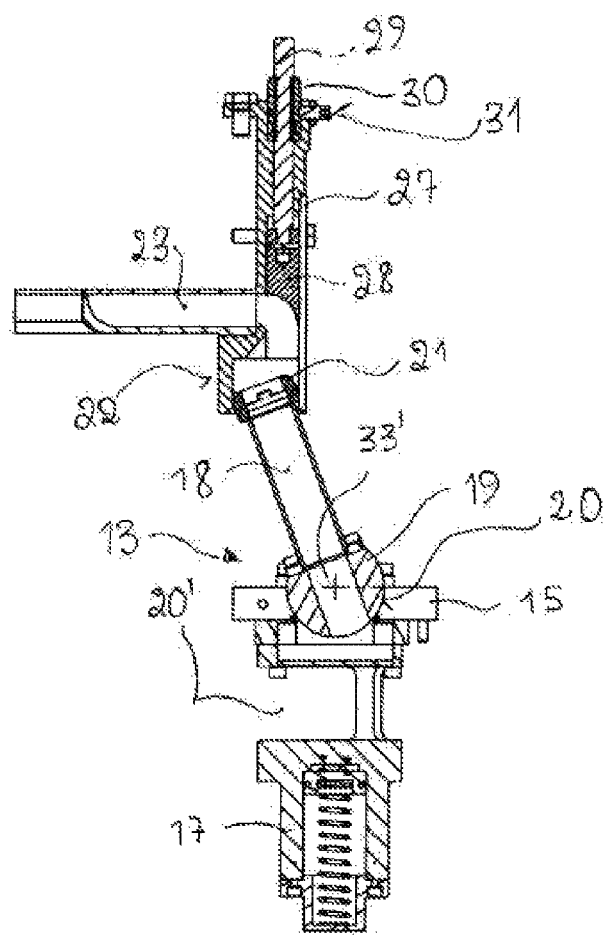
FIG. 5 is a partial view of the cooling air guide according to FIG. 3 in a sectional representation.
Figure 6:
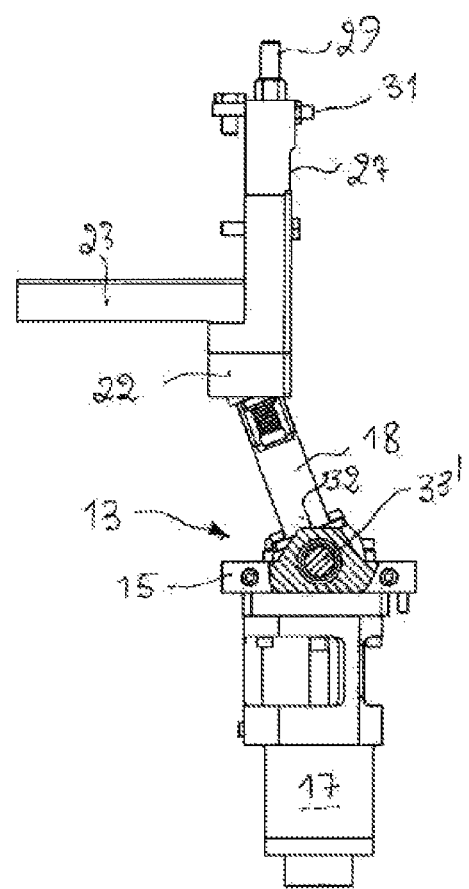
FIG. 6 is a partial view according to the cooling air guide of FIG. 5 in partial sectional view.
Figure 7:
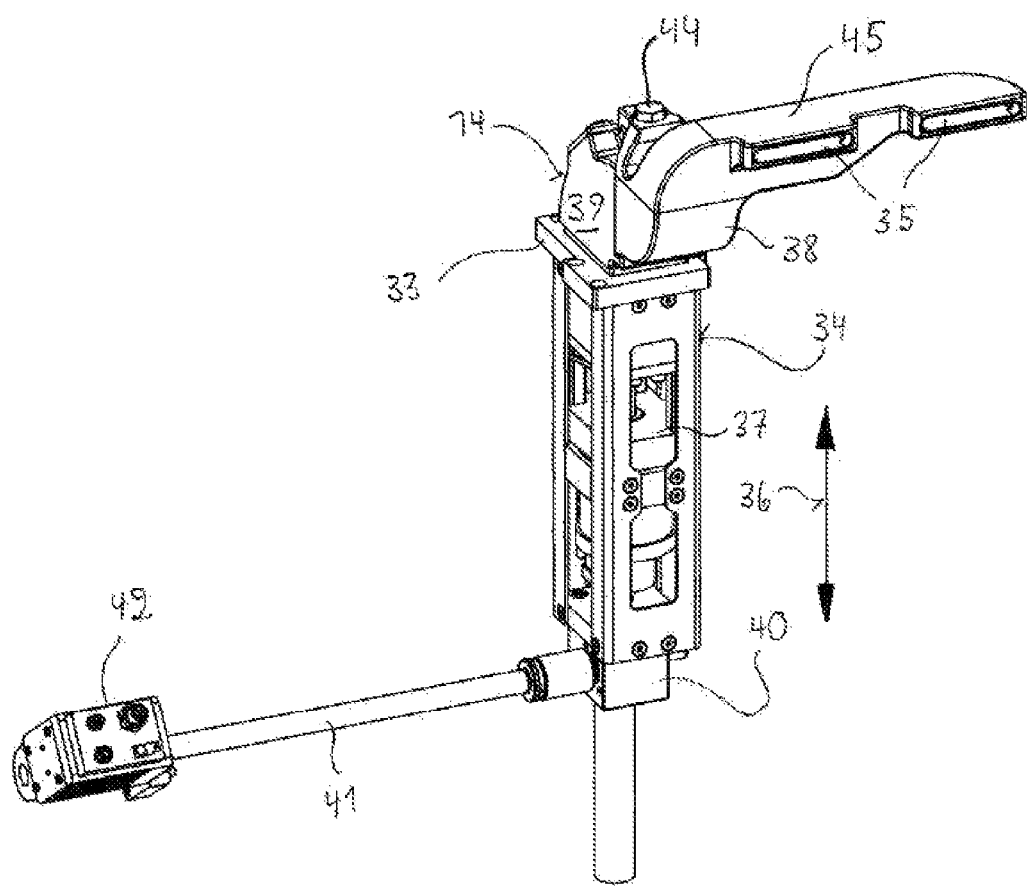
FIG. 7 is an isolated perspective side view of the cooling air guide for the neck ring cooling section.
Figure 8:
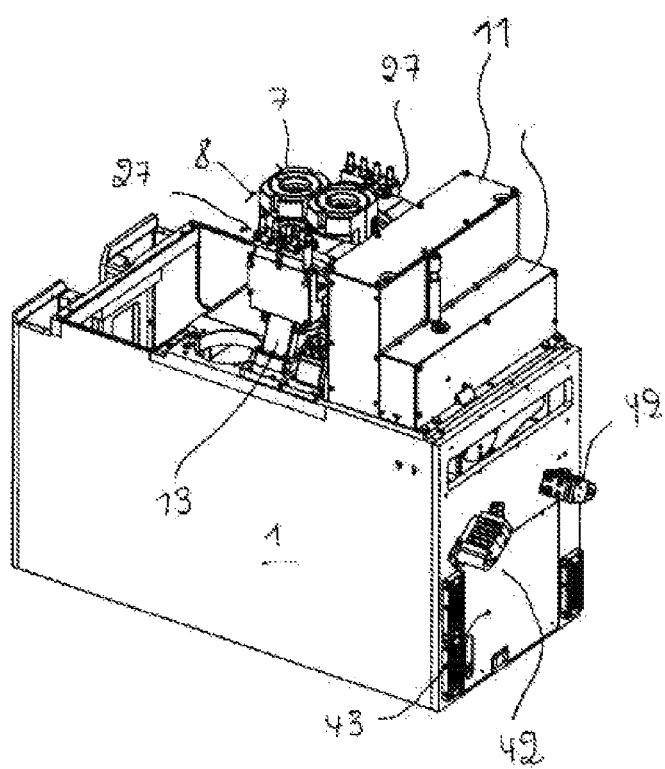
FIG. 8 is a perspective view of the station box supporting the mold holder mechanism of FIG. 1.
Figure 9:
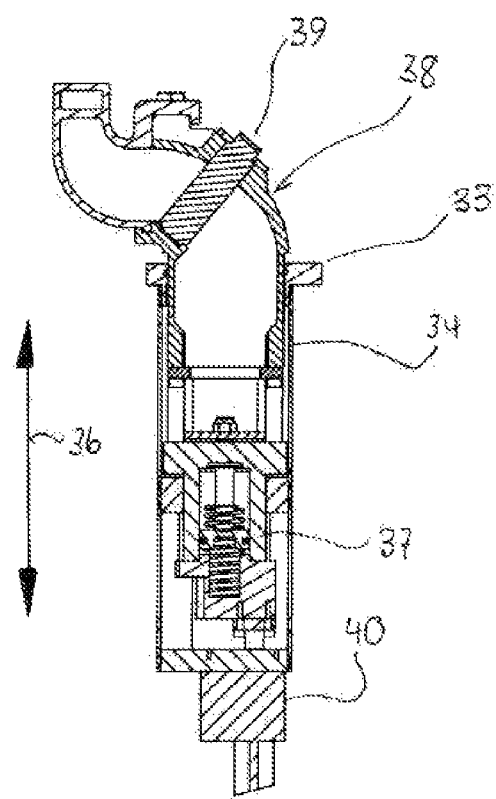
FIG. 9 is a partial sectional view of the cooling air guide according to FIG. 7.

The station box of an I.S. machine, on which or at which a mold holding mechanism 2 is arranged, is designated by 1 in FIGS. 1 and 2. To produce a cooling air supply, the station box 1 can be set at a pressure greater than atmospheric, from which the cooling air supply for both the molds and its finish area is derived, wherein the cooling air guide within the mold holding mechanism 2 is explained in more detail below.

The mold holding mechanism 2 is configured by way of example for holding two molds 3, 4 intended for the molding of hollow glass articles, each of which consists of two mold halves 5, 6 or 7, 8. The mold halves 5, 6, 7, 8 are supported by mold holders 9, 10, which are arranged in parallel inside of a housing section 11, and with the help of a drive, not shown, are displaceable in a horizontal plane in the direction of arrows 12 between a closed position of the mold halves shown in the drawings and their open position.

The neck ring cooling section is designated by 14, namely the connection of the cooling air feed intended for the finish area to the station housing 1, and the mold cooling section is designated by 13, namely the connection of the cooling air feed intended for the molds to the station housing 1, wherein these connections are created such that conditional distance and direction changes relative to the mold halves can be bridged by the opening and closing movement of the mold halves 5, 6, 7, 8. This will be discussed in more detail below.

As will also be explained hereinafter, the mold cooling section 13 and the neck ring cooling section 14 are applied as 360° cooling, that is, as cooling which is uniformly effective during an entire cycle of opening and closing movement of the mold halves 5 to 8.

In FIGS. 3 to 9 are functional elements that match those of FIGS. 1 and 2, numbered accordingly, so that repeated description with relation to this can be omitted.

The mold cooling section 13 is characterized by a plate-like receptacle 15 which is arranged on the upper side 16 of the station housing 1 and which as part of the cooling air guide forms the link between a valve 17 arranged within the station housing 1 and a pivotally arranged cooling channel 18 that is rectangular in cross-section. The cooling channel 18 terminates on its side adjacent to or facing the receptacle 15 in a spherical guide body 19 which is received in a profile-corresponding guide section 20 of the receptacle 15, producing a flow path for the cooling air, which conducts from an air inlet 20 through the guide section 19 into the cooling channel 18, wherein closing members of the valve are arranged within this flow path.

Bearing flanges are designated by 32, which are formed laterally on the receptacle 15, in which the guide body 19 is rotatably supported on both sides about the axis 33 by means of rolling bearings. These rolling bearings are housed completely within the bearing flanges 32 and lubricated for service life.

The end of the cooling channel 18 opposite of or facing away from the receptacle 15 terminates in a spherical bearing body 21 made of bronze, which sealingly abuts the inner side of the intake section 22, producing a flow path into a cooling piece that terminates in an arrangement of circular ring section outlet slots. The cooling channel 18 and the intake section 22 are configured rectangular in cross-section, so that during an opening or closing movement of the mold halves, the bearing body 21 executes a pivoting and sliding movement on the inner side of the intake section 22 to compensate for changes in length and angle. Due to the fact that the bearing body 21 is arranged within a throttle housing 27, an optimal protection is given for the sliding guide against the abrasive dirt arising in the operating environment.

It can be seen that the technical implementation of these movement conditions are characterized by only slight relative movements of the elements sliding on one another, resulting in less wear.

It can further be seen that due to the bilateral articulated connection of the cooling channel 18, the opening and closing movements of the mold halves can be performed without hindrance.

With an expansion of the closing mechanism, the valve 17 together with housing including the cooling channel 18 mounted thereon can remain in or on the station box 1, while the cooling piece 23 remains on the mold holder of the closing mechanism.

The said arrangement of the outlet slots 24 extends along a semi-circle, which is geometrically adapted to an arrangement of cooling air holes 25 which pass through the walls of each mold half 5 parallel to the axis. The connecting section 22 and the cooling piece 23 form part of a support assembly 26, which supports a respective mold half 6 and thus is movably arranged in accordance with the opening and closing movements of the mold halves 5 relative to the station box 1.

Each mold half 6 is provided in its lower section with a step 46 which forms a horizontal circular ring segment surface, which is engaged below by the cooling piece 23, in the region of the outlet slots 24, from which the cooling air exits vertically and enters directly into the cooling air holes 25 of the mold half 6. Such cooling air holes 25 are present throughout the entire circumference of the mold. The cooling piece 23 is secured on the step 46 by screws, so that if necessary, a simple interchangeability is provided. The cooling piece 23 is preferably located at a constant height in relation to the mold holder 9, so that no adaptation work is required in the transition to another mold height.

The cooling piece 23 is preferably located in the lower half of the mold height, so that an excessive cooling of the parison in the neck region, which at least impedes its elongation, is avoided in accordance with the respective blowing method. Due to the cooling air flowing upward in the cooling air holes 25, an adequate cooling of the bottom region of the parison is also prevented in the blank mold, so that the surface of the station box 1 is excessively heated, which is accompanied by the risk of turbulence and impairment of the neck ring cooling-section.

A step of the support assembly 26 is designated by 47, which is located on its side facing toward the molds and on which the cooling piece 23 is mounted and secured with screws.

A throttle housing is denoted with 27, which is also connected to the support assembly 26 and serves to receive a mechanism designed to change the flow cross-section of the cooling air within the flow path between the connecting section 22 and the cooling piece 23, here to control between a maximum and a minimum opening. A blocking body 28 is provided for this purpose, which is displaceable by means of a spindle gear more or less in said flow cross-section. Each of the spindle gear consists of a threaded spindle 29, which is in operative connection with an axially non-displaceably arranged spindle nut 30, the position of which can be fixed in defined latch positions corresponding to a specific flow cross-section by means of a ball pressure piece 31.

The support assembly 26 and with this the throttle housing 27 are fastened by means of screws 48, 49 to the respective mold holder 9. In each throttle body 27 are thus found means required for the throttling of the cooling air flow to a mold half 5 to 8. Other divisions of the cooling air flow are also possible, such as, for example, an embodiment in which each throttle housing is associated with each half of a mold half 5 to 8.

In the embodiment shown, each mold half 6 is associated with two threaded spindles 29 and thus two blocking bodies 28. This grouping and equally the structural design of the drive of the locking body 28 can be varied as desired within the scope of the expert knowledge, but will not be discussed in more detail. It is essential that starting from an air inlet 20 via the valve 17, the line section 18, the connecting section 22, the air distribution section 23, the outlet slots 24 and the cooling air holes 25, a continuous flow path for cooling the molds 3, 4 is produced, wherein a complete closure of the flow path can be produced via the respective valve 17 and wherein a throttling of the cooling air flow can be achieved by controlling the blocking body 28.

The cooling structure 50 intended for the connection of the neck ring cooling section 14 is characterized by a base plate 33, on which a guide housing 34 is arranged suspended within the station box 1. Within the guide housing 34, in the directions of the arrows 36, a structural unit, which comprises a valve 37 and the cooling structure 50, is vertically displaceable. The valve 37 and the cooling structure 50 are mounted on each other, so that via the cooling structure 50, flow-optimized lines for conducting cooling air are made available, which terminate on the side facing away from the base plate 33 in outlet slots 35. The latter have a horizontal outlet direction and are directed to the finish area of the respective mold.

A cooling air flow to the finish area of the mold can be completely blocked or opened via the valve 37.

Within the lines of the cooling structure 14, 38 consisting of cast iron, there is in each case a throttling device 39, via the setting of which the cooling air flow reaching the finish area can be reduced or increased. In the exemplary embodiment shown, by way of example, a cooling structure 38 having two outlet slots 35, is associated with a mold half 5. The section 45 of the cooling structure 38 guiding the outlet slots 35 is held by a screw 44 to the cooling structure 50, so that an easily handled mounting option is provided to replace this section 45 when the mold is changed for reasons of geometry or in case of damage.

A screw jack is designated by 40, which is connected to a stepper motor or servomotor via a drive shaft 41 to a drive 42, which motor protrudes from a rear wall 43 of the station box 1. The screw jack 40 is connected to the guide housing 34 and is used, via a spindle shaft not shown in the drawing, for the adjustment of the height position of the outlet slots 35, so that the finish area cooling according to the invention is easily adaptable to different mold heights. A height adjustment is thus possible by a motor-driven displacement of the cooling structure 38 in the direction of the arrows 36.

A conversion to another mold height can thus be handled using an article database in which the height dimensions of different articles are stored. In this way, a simple and especially fast conversion of the neck ring cooling section 14 to other mold heights can be performed.

According to the invention, the cooling piece 23 has a constant height in comparison to the mold holder 9, 10, so that in this respect no adjustment work is required when transitioning to a different mold height.

The drive 42 protrudes from an opening in the end face 43 of the station box 1 and is arranged easily accessible in this way. If necessary, it can be pulled out of the screw jack 40 together with the drive shaft 41 and inserted in the opposite direction. For a simplified re-insertion into the screw jack 40, a centering aid, not shown in the drawing, can be made available in the station box 1.

The screw jack 40 hangs on the underside of the guide housing 34 and is thus located within the station box 1. It is thus arranged protected against influences from the glass molding process.

The station box 1 may be set at a pressure greater than atmospheric to produce a cooling air supply. It can be seen that the valve 37 and in particular the screw jack 40 are arranged within the station box 1 protected from abrasive environmental influences, here the glass production process.

Figure 10:
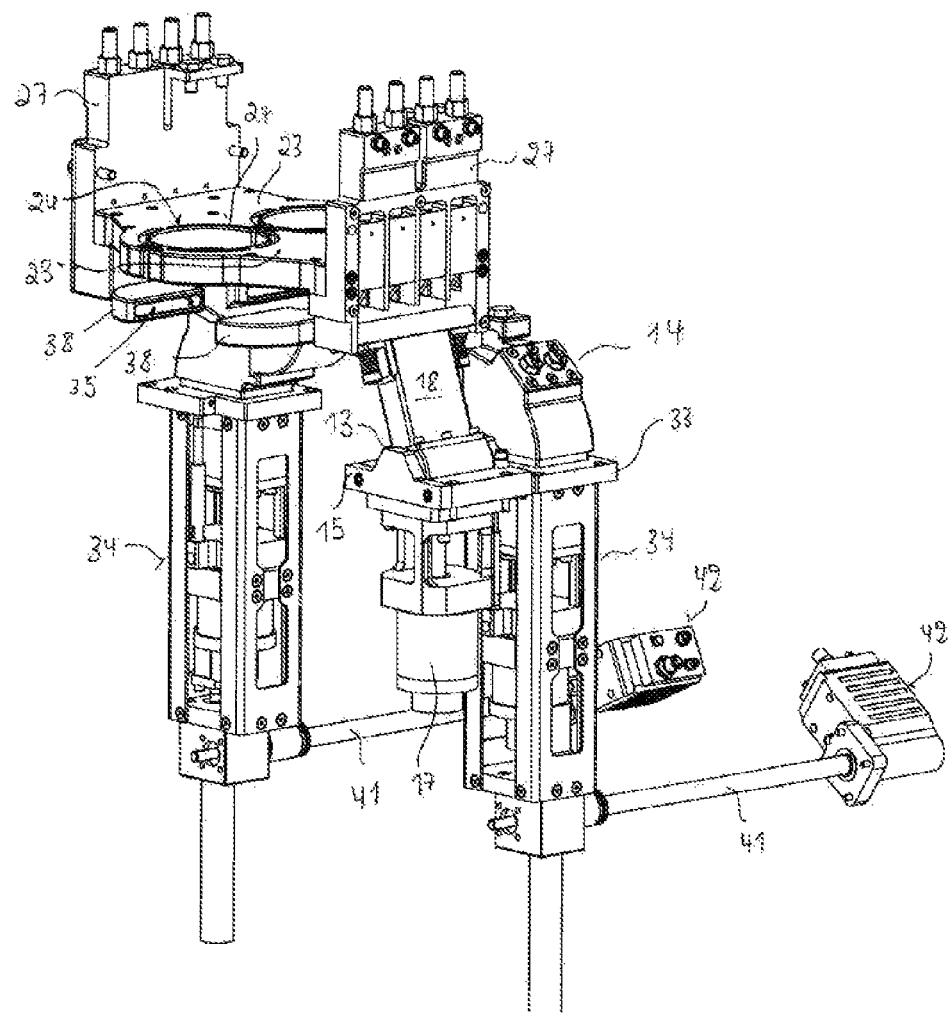
FIG. 10 is an overall perspective view of the cooling air guides for the mold and the neck ring cooling sections.

FIG. 10 shows the juxtaposition of the above-described components of the mold cooling section 13 and the neck ring cooling section 14 according to the invention.

It can be seen that with the mold holding mechanism according to the invention, a flexible, service-friendly designed system for cooling air guide is provided, which is characterized by mutually independent controls of a finish cooling section and a mold cooling section.

LIST OF REFERENCE NUMBERS

1. Station box
2. Mold holding mechanism
3. Mold
4. Mold
5. Mold half
6. Mold half
7. Mold half
8. Mold half
9. Mold holder
10. Mold holder
11. Housing section
12. Arrows
13. Mold cooling section
14. Neck ring cooling section
15. Receptacle
16. Top side
17. Valve
18. Cooling channel
19. Guide body
20. Guide section
20'. Air inlet
21. Bronze piece
22. Connecting section
23. Cooling piece
24. Air outlet
25. Cooling air hole
26. Assembly
27. Throttle housing
28. Blocking body
29. Threaded spindle
30. Spindle nut
31. Ball pressure piece
32. Bearing cheek
33. Baseplate
33'. Axis
34. Guide housing
35. Outlet slot
36. Arrows
37. Valve
38. Cooling structure
39. Throttling device
40. Screw jack
41. Drive shaft
42. Drive
43. End face
44. Screw
45. Section
46. Step
47. Step
48. Screw
49. Screw
50. Cooling structure

The invention claimed is:

1. A mold and neck ring cooling system for a glass molding machine comprising:
    a station box;
    at least one mold associated with said station box and having two mold halves, each of the mold halves being arranged on a mold holder and movable between an open and a closed position, said at least one mold is associated with a neck ring cooling section and a mold cooling section;
    a cooling air supply provided within the station box, wherein the neck ring cooling section and the mold cooling section are connected independently of each other and to separate openings of the station box,
    a support assembly connected to said mold holder, said support assembly having a cooling piece and a connecting section, said cooling piece being detachably connected to said support assembly and forming a link to at least one of said mold halves; and
    said mold cooling section comprises a cooling channel having a first end which is connected in an articulated manner to the station box and a second end which is connected in an articulated manner to said support assembly so as to allow compensation for changes of length between the station box and support assembly, the cooling channel being pivotable about a horizontal axis at its said first end and slidably received at its said second end in said connecting section of the support assembly.

2. The system according to claim 1, wherein the second end of the cooling channel is slidable within and engages an inner side of the connecting section of the support assembly.

3. The system according to claim 1, wherein the support assembly is releasably connected to the mold holder and includes a throttle housing, which is equipped with means for changing a cooling air flow of the mold cooling section.

4. The system according to claim 3, wherein said means for changing the cooling air flow comprises a blocking body which is slidable in a flow path of the cooling air flow to change a cross-section of the flow path.

5. The system according to claim 1, wherein the cooling channel has a rectangular cross-section and is in operative connection with the station box via a valve.

6. The system according to claim 1, wherein the cooling piece has an arrangement of air outlets with vertically oriented outlet direction and a part of the cooling piece supporting the air outlets is configured to engage under a step of a mold half, cooling air holes of the mold halves each form continuous flow paths.

7. The system according to claim 6, wherein the step is located in a region of a lower half of a height of said at least one of said mold halves.

8. The system according to claim 1, wherein the cooling piece is mounted on a step of the support assembly and is detachably connected thereto.

9. The system according to claim 1, wherein the cooling piece is located at a fixed height in relation to the mold holder.

10. The system according to claim 1, wherein the neck ring cooling section has a cooling structure arranged partly inside the station box and supports a valve, the cooling structure having outlet slots at an end facing away from the station box.

11. The system according to claim 10, wherein the cooling structure has a releasably arranged section supporting the outlet slots at an end facing toward the outlet slots.

12. The system according to claim 10, wherein the cooling structure is arranged to be height-adjustable relative to the station box.

13. The system according to claim 10, wherein the outlet slots have a horizontal outflow direction.

14. The system according to claim 11, wherein the cooling structure is arranged to be height-adjustable within a guide housing, wherein the guide housing is connected to the station box, and wherein a screw jack is provided to produce the height-adjustability, the screw jack being connected to a drive via a drive shaft.

15. The system according to claim 14, wherein the drive is arranged on the outside of the station box.

16. The system according to claim 14, further comprising an article database, wherein different height dimensions of used molds are stored in the article database and which is in operative connection with the drive.

17. The system according to claim 1, wherein devices for throttling a cooling air flow are arranged within flow paths for the cooling air flow which are configured for the neck ring cooling section.

18. The system according to claim 2, wherein the support assembly is releasably connected to the mold holder and includes a throttle housing, wherein the throttle housing is equipped with means for changing a cooling air flow of the mold cooling.

19. The system according to claim 2, wherein the cooling channel has a rectangular cross-section and is in operative connection with the station box via a valve.

20. The system according to claim 2, wherein the cooling piece has an arrangement of air outlets with each of said air outlets having a vertically oriented outlet direction, and a part of the cooling piece supporting the air outlets is configured to engage under a step of at least one of said mold halves, wherein the cooling air holes of the mold halves each form continuous flow paths.

21. The system according to claim 1, wherein the support assembly is releasably connected to the mold holder and includes a throttle housing defining a flow path through which cooling air flows and which housing includes a blocking body that is slidable therein to change a cross-section of the flow path for changing the flow of the cooling air of the mold cooling.

* * * * *